Nov. 24, 1964  A. W. SCRIBNER  3,158,262
METAL EXTRUSION
Original Filed Nov. 1, 1961

Albert W. Scribner

United States Patent Office 3,158,262
Patented Nov. 24, 1964

3,158,262
METAL EXTRUSION
Albert W. Scribner, 6 Country Club Road,
Darien, Conn.
Original application Nov. 1, 1961, Ser. No. 149,300, now Patent No. 3,146,886, dated Sept. 1, 1964. Divided and this application Sept. 6, 1963, Ser. No. 307,140
4 Claims. (Cl. 207—9)

This is a division of my copending application entitled Metal Extrusion, Serial No. 149,300 filed on Nov. 1, 1961, issued as U.S. Patent No. 3,146,886, dated September 1, 1964.

The instant invention relates to a novel method and apparatus for die expressing metals and the like whereby a given size extruded product may be produced by a relatively small size press.

One object of the invention is to provide an extrusion process which utilizes a series of die expressing strokes each of which serves to extrude only a portion of the work material and to form an unextruded portion of the work material to a sectional profile corresponding substantially to the shape of the extrusion orifice; each such formed unextruded work portion being advanced through said orifice before the initiation of the next succeeding die expressing stroke.

Another object of the invention is to provide a novel extrusion apparatus having at least one extrusion ram adapted to extrude and form successive billet portions and having a feed ram adapted to advance the formed unextruded work material through the extrusion orifice during the period between the extrusion of the successive billet portions, the inner end of said extrusion ram being formed so as to correspond in profile to an adjacent portion of the extrusion orifice.

Other objects of the invention will become apparent as the disclosure progresses.

FIGS. 1–4 show an illustrative embodiment of the instant invention wherein an I beam type of extruded product is to be die expressed. It will be understood however that various extruded shapes may be die expressed in accordance with the hereinafter described extrusion technique by appropriately changing the shape of the work forming tool surfaces so as to correspond to the particular sectional contour desired for the extruded product.

Figure 1:
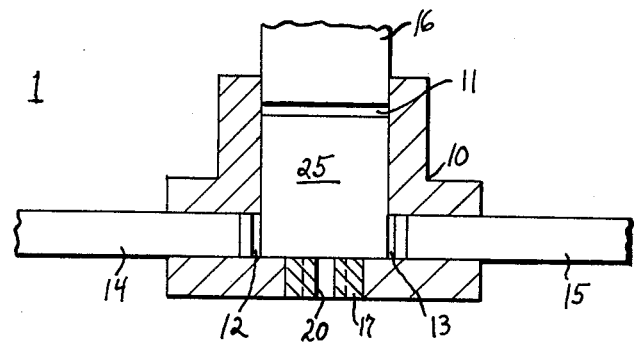
FIG. 1 is a plan view in partial section of one embodiment of an apparatus that is capable of carrying out the instant extrusion technique.
Figure 3:
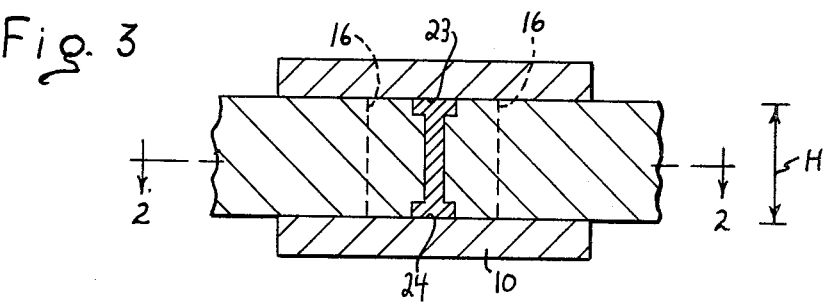
FIG. 3 is a sectional elevational view taken along section line 3—3 of FIG. 2.
Figure 4:
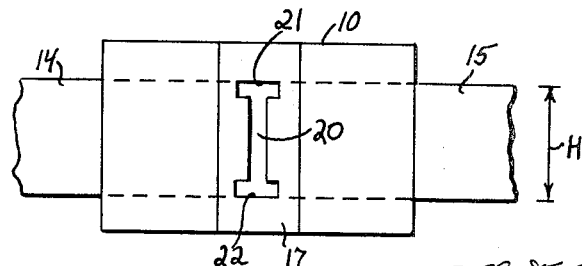
FIG. 4 is a front elevational view showing part of the apparatus of FIG. 1.

Referring to FIG. 1 there is shown a container 10 of general T-shaped configuration and having a rectangular cross sectioned billet receiving chamber 11 formed therein. Two narrow laterally opposed coextensive rectangularly cross sectioned ram guide chambers 12 and 13 are formed by container walls. A pair of extrusion rams 14 and 15 are slidably mounted in said chambers 12 and 13 respectively and a feed ram 16 is slidably mounted in the container 10 at the upper end of said chamber 11 as illustrated in FIG. 1. The rams are cross sectionally shaped so as to closely fit their respectively associated chambers. As shown in FIG. 3 the heights H of the rams 14, 15 and 16 are substantially the same. Operatively mounted in the container walls opposite ram 16 is a die 17 having an orifice 20 uniformly formed therethrough and being sectionally shaped like an I-beam section. The height H, FIG. 4, of said orifice is also substantially the same as the said height H, FIG. 3, of said rams. The inner ends of rams 14 and 15 are shaped so that when said rams are moved to their respective inner limits of movement the shape of the gap therebetween, in a plane normal to the die axis, is not only substantially the same as the FIG. 4 shape of the orifice 20 but is also substantially axially coextensive therewith as is illustrated by FIGS. 3 and 4. The upper and lower limits 21 and 22, FIG. 4, of the orifice 20 are substantially coextensive with the respectively adjacent upper and lower wall surfaces 23 and 24, FIG. 3, of the container 10.

Figure 2:
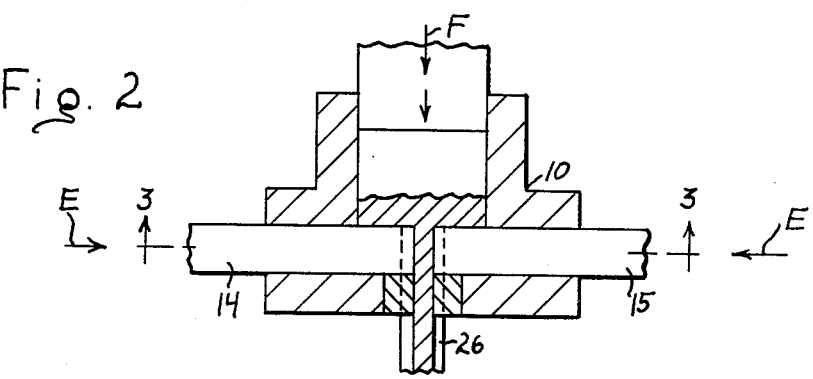
FIG. 2 is similar to FIG. 1 and shows an active condition of the press rams.

In operation after a billet 25 has been inserted in the box-like chamber 11 the feed ram 16 is advanced until the lead end of the billet is seated against the inner flat face of the extrusion die. Thereafter while ram 16 is held stationary the extrusion rams 14 and 15 are each advanced through extrusion strokes E as shown in FIG. 2 so as to die express a portion 26 of the work material. The rams 14 and 15 are then withdrawn to their FIG. 1 positions and the feed ram 16 is advanced through a first relatively short incremental feed stroke F, FIG. 2. During the stroke F the unextruded portion of the work material that was just previously formed between the inner contoured ends of the narrow rams 14 and 15 will readily slide through the extrusion orifice 20 in that this formed unextruded portion of the work has substantially the same sectional shape as that of the die orifice due to the said relative contouring of the inner ends of rams 14 and 15. The length of the stroke F is substantially equal to the width of the rams 14 and 15, i.e., stroke F is just sufficient to bring the flat wide unformed and unextruded shoulder portion of the billet against the flat inner faces of die 17 and adjacent portions of the container walls. Thereafter rams 14 and 15 are again advanced through similar extrusion strokes to die express a further portion of the billet material. These alternate extrusion strokes E and feeding strokes F are continued until the usable part of the work billet has been extruded. The instant technique requires only the application of repetitive light extrusion strokes with the very light alternate feeding strokes and such will thereby necessitate a relatively small press frame, low overall working forces and a relatively small power drive means to produce and accommodate the desired extrusion pressures in the container and die orifice.

In the cold extrusion of hard metals the use of a proper lubricant is necessary to avoid excessive tool wear, etc. It is known to use a vitreous material for hot extrusion of steel, however, such known lubricants do not suffice for cold extrusion below say 400 degrees F. A lubricant which may be used between the work metal and the tool surfaces during a cold extrusion operation in the manner of use of said vitreous lubricants is an oxide of arsenic such as arsenic trioxide. Also potassium arsenate and beryllium fluoride may be utilized. Other arsenic type lubricants which are suitable here are silver arsenate, arsenious oxide, arsenic disulfide and benzene arsonic acid. These materials which may be in pad form or coated on the billet are fusion sensitive to low temperatures and/or high pressures whereby the fusing thereof produced by the extrusion action will afford a fused layer of lubricant for the tool surfaces during the die expressing operation. Where the lubricant or the outer surfaces of the work material require rapid heating a layer of exothermic material, such as "Thermit," may be coated on the outer surfaces of the tools and/or work billet. Here the outer layer of work material melted by the exothermic action during the extrusion operation will provide a viscous lubricant film between the work and tools.

While several embodiments of the invention have been shown and described it will be apparent to those skilled in the art that numerous variations and modifications may be made in the particular construction and method without departing from the underlying principles of the invention. It is therefore desired by the following claims to include within the scope of the invention all such variations and modifications whereby substantially the results of the invention may be obtained by the use of substantially the same or equivalent means or techniques.

The invention claimed is:

1. A method of extruding metal: comprising the steps of operatively confining a work billet adjacent an extrusion die orifice;

laterally compressing the region of the work billet adjacent said extrusion die orifice so that a portion of this billet region is die expressed through said orifice; forming the remaining unextruded portion of said billet region so as to have substantially the same sectional shape as said die orifice and so as to be located in substantially coextensive alignment with said orifice; advancing all of the unextruded billet material toward said orifice so that said formed portion of said billet region slides through the corresponding shaped extrusion orifice with substantially no extrusion action taking place; and sequentially repeating said compressing, forming and advancing steps to complete the extrusion of the billet material.

2. In an extrusion press:

a container having a work receiving chamber formed therein;

a feed ram slidably mounted in said container for work feed movement into said chamber;

an extrusion die formed with an extrusion orifice and operatively mounted at one end of said chamber; and at least one laterally disposed extrusion ram slidably mounted in said container for movement into said chamber and toward the axis of said die orifice at a location immediately adjacent to the front operative face of said die; the inner end of said ram being contoured so as to correspond to the adjacent portion of the profile of the die orifice, and the inner limit of movement of the extrusion ram being such as to position the contoured surfaces of said inner ram end in substantially coextensive alignment with respect to the said adjacent portion of the profile of said die orifice.

3. Apparatus as defined by claim 2 wherein the heights of said chamber, rams and the die orifice are substantially the same.

4. Apparatus as defined by claim 3: additionally comprising a second extrusion ram slidably mounted in said container in opposed relation with respect to the first mentioned extrusion ram, said second extrusion ram having an inner end that is also contoured so as to correspond to the adjacent portion of said die orifice, said extrusion rams being disposed substantially normal with respect to the axis of said die orifice.

References Cited by the Examiner

UNITED STATES PATENTS

| 2,708,770 | 5/55 | Herres et al. | 18—12 |
| 2,902,714 | 9/59 | Johnson | 18—12 |
| 2,975,893 | 3/61 | Johnson | 207—2 |

MICHAEL V. BRINDISI, *Primary Examiner.*